United States Patent [19]

Ou et al.

[11] Patent Number: 5,952,541

[45] Date of Patent: *Sep. 14, 1999

[54] METHOD OF LOADING HYDROGEN HALIDE ONTO AN ADSORBENT TO ENABLE REMOVAL OF LEAD IMPURITIES FROM LIQUID HYDROCARBONS

[75] Inventors: John Di-Yi Ou; Daniel David Rosenfeld, both of Houston, Tex.

[73] Assignee: Exxon Chemical Patents, Inc., Houston, Tex.

[*] Notice: This patent is subject to a terminal disclaimer.

[21] Appl. No.: 08/694,859

[22] Filed: Aug. 9, 1996

Related U.S. Application Data

[63] Continuation of application No. 08/277,535, Jul. 19, 1994, abandoned, which is a continuation of application No. 07/922,310, Jul. 30, 1992, abandoned.

[51] Int. Cl.[6] ....................................................... C07C 7/12
[52] U.S. Cl. ............................................. 585/823; 502/60
[58] Field of Search ........................... 423/240 R, 240 S, 423/245.1; 95/142; 502/60, 62, 224; 585/823; 210/690, 691

[56] References Cited

U.S. PATENT DOCUMENTS

| | | | |
|---|---|---|---|
| 2,368,261 | 1/1945 | Neef, Jr. ...................................... | 196/39 |
| 2,413,868 | 1/1947 | Frey ........................................... | 502/224 |
| 2,882,243 | 4/1959 | Milton ........................................ | 252/455 |
| 2,882,244 | 4/1959 | Milton ........................................ | 252/455 |
| 2,883,244 | 4/1959 | Berger ........................................ | 308/6 |
| 3,130,007 | 4/1964 | Breck ......................................... | 23/113 |
| 3,594,331 | 7/1971 | Elliott, Jr. .................................. | 502/60 |
| 3,630,965 | 12/1971 | Voorhies, Jr. et al. ................... | 502/60 |
| 3,699,056 | 10/1972 | Takase et al. ............................. | 502/60 |
| 3,862,900 | 1/1975 | Reusser .................................... | 208/262 |
| 3,893,912 | 7/1975 | Zimmerman ............................. | 208/253 |
| 4,025,605 | 5/1977 | Dalton, Jr. et al. ................. | 423/240 R |
| 4,424,120 | 1/1984 | Audeh ...................................... | 208/253 |
| 4,921,924 | 5/1990 | Atwood .................................... | 526/339 |
| 5,107,061 | 4/1992 | Ou et al. ................................... | 585/823 |

FOREIGN PATENT DOCUMENTS

| | | |
|---|---|---|
| 2361025 | 6/1975 | Germany . |
| 9115444 | 10/1991 | WIPO . |

OTHER PUBLICATIONS

A.A. Zimmerman, G.S. Musser, B.J. Kraus, P.E. Godici, and J.R. Siegel;, "Removal of Lead Contamination from Unleaded Gasoline"; pp. 1–14; SAE Fuels and Lubricants Meeting (Houston Jun. 3–5, 1975; Technical Paper; Chemical Abstracts vol. 85–1976, 49026G.

*Primary Examiner*—Michael Lewis
*Assistant Examiner*—Thomas G. Dunn, Jr.
*Attorney, Agent, or Firm*—James A. Zboray; Linda K. Russell

[57] ABSTRACT

Lead impurities are removed from a liquid hydrocarbon stream by contacting the hydrocarbon stream with an adsorbent, which has been prepared by contacting the adsorbent with an organohalide under conditions which cause the organohalide to decompose; thus, producing an adsorbent containing hydrogen halide.

15 Claims, No Drawings

METHOD OF LOADING HYDROGEN HALIDE ONTO AN ADSORBENT TO ENABLE REMOVAL OF LEAD IMPURITIES FROM LIQUID HYDROCARBONS

This is a continuation of application Ser. No. 08/277,535, filed Jul. 19, 1994 now abandoned, which is a continuation of application Ser. No. 07/922,310, filed Jul. 30, 1992, now abandoned.

BACKGROUND OF THE INVENTION

1. Field of the Invention

This invention relates to a safer process of loading a hydrogen halide onto an adsorbent and using that adsorbent in a process for removal of impurities from liquid hydrocarbons. More specifically, this invention relates to the removal of lead impurities from hydrocarbon streams.

2. Description of the Prior Art

The ability to remove impurities from hydrocarbon streams is extremely important in the petrochemical and refining industries for both cost and environmental reasons. Impurities in hydrocarbon feedstocks can cause catalyst poisoning of those catalysts used in the manufacturing process. The poisoning of the catalysts necessitates the costly replacement or premature regeneration. The greater convenience of this invention makes it easier to remove lead impurities in accordance with tightening environmental regulations.

There are several ways to remove lead from liquid hydrocarbons, including gasoline. For example, cupric chloride impregnated on nongraphitic carbon or on silica gel can be used for removing lead contamination; A. A. Zimmerman, G. S. Musser et al., SAE Fuels and Lubricants Meeting. (Houston Jun. 3–5, 1975) Technical Paper; Chemical Abstracts vol. 85-1976, 49026 G. Strongly acidic cation exchangers can be used to remove lead (German Pat. DT No. 2,361,025). $SiCl_4$, $CuCl_2$, $CuBr_2$, $I_2$, or $I_2$ combined with an acid, can be used to pretreat a hydrocarbon, which is then followed by contacting step with activated carbon and an acid treated clay or silica gel to remove lead (U.S. Pat. No. 3,893,912). Aqueous sorbents can be used to remove lead contaminants from gasoline as taught by U.S. Pat. No. 2,368,261 (Neef). However, large amounts of lead, as much as 0.20 gm per gallon (approximately 70 parts per million (ppm)), remain after the treatment.

More effective technology, which is also more dangerous, is disclosed in U.S. Pat. No. 4,424,120 (Audeh), utilizes hydrogen chloride in a process which reduces lead levels in gasoline to less than 0.20 gm per 16,000 gallons (0.004 ppm). However, the adsorbent preparation procedure disclosed by Audeh requires passing 100% anhydrous hydrogen chloride through an adsorbent column until the adsorbent is sufficiently saturated with this dangerous acid. Such an operation requires serious safety precautions.

Anhydrous hydrogen chloride is a colorless gas with a sharp, pungent odor. On contact with the moisture in air, it forms dense poisonous fumes of hydrochloric acid which requires special handling. Due to these dangers, the Occupational Safety and Health Association (OSHA) has placed a ceiling limit on hydrogen chloride of 5 molar ppm on a time-weighted average exposure limit (ACGIN, 1984-85). and requires that it be used only in well-ventilated areas to prevent accumulation above this ceiling limit. It is irritating and corrosive to the upper and lower respiratory tracts, skin and eyes. Internal symptoms include tearing, coughing, labored breathing, and excessive salivary and mucous formation. Excessive irritation of the lungs causes acute pneumonitis and pulmonary edema, which could be fatal. Hydrochloric acid burns exhibit severe pain, redness, possible swelling and early necrosis.

Because of these dangers, special protective equipment is required on a routine basis, including chemical gloves, and safety goggles or face shield. In the event of a spill or release of hydrogen chloride, a general evacuation of all people in the area is required. Emergency personnel require additional special protective equipment, including positive-pressure air lines with mask or self-contained breathing apparatus.

Hydrogen chloride attacks metals as well as people, as it is very corrosive to metallic process equipment. Special precautions must be taken to ensure the hydrogen chloride does not get contaminated with moisture as most metals corrode rapidly when in contact with wet hydrogen chloride. Plant equipment utilizing hydrogen chloride must employ very costly acid resistant materials, such as stainless steel or rubber-lined carbon steel. For example, stainless steel costs five times what carbon steel costs.

Because of these safety and cost considerations, it is prohibitive to use hydrogen chloride for large-scale operations. The other hydrogen halides, such as hydrogen bromide ($HBr_2$), hydrogen floride ($HF_2$), and hydrogen iodide ($HI_2$), have similar characteristics to hydrogen chloride since they are also strong acids.

The present invention provides a very safe and cost effective way to load the hydrogen halide onto an adsorbent. This invention may remove more of the lead from liquid hydrocarbon than other methods. This new process can reduce the lead contamination in a raffinate feedstock of 44 ppm to less than 1 ppm.

SUMMARY OF THE INVENTION

This application is directed towards a novel method of adsorbing a hydrogen halide onto an adsorbent comprising contacting said adsorbent with an organohalide under conditions effective to decompose said organohalide into an unsaturated hydrocarbon molecule and a molecule of hydrogen halide and to absorb said molecule of hydrogen halide.

This application is also directed towards a process to remove lead comprising contacting a hydrocarbon stream containing lead with the adsorbent produced or prepared per this specification.

DESCRIPTION OF SPECIFIC EMBODIMENTS

The novel process in accordance with the invention disclosed herein is generally useful for removing alkyl lead impurities from any liquid hydrocarbon media. It is suitable for treating petroleum oils of lubricating viscosity, distillate fuel oils, gasoline and similar light liquid hydrocarbon products including both mineral oil and synthetic hydrocarbon products.

The adsorbent is first prepared as described in U.S. Pat. No. 5,107,061 the disclosure of which is hereby incorporated by reference herein thereto.

The hydrogen halide is loaded into an adsorbent by removing organically-combined halide, i.e., organohalides, from hydrocarbon streams containing organohalides by subjecting the hydrocarbon stream to appropriate catalytic materials for a time and under suitable conditions effective to decompose the organohalides into its unsaturated hydrocarbon molecule and a molecule of hydrogen halide, the latter of which is then absorbed by an adsorbent effective for this purpose.

The hydrogen halide can be more advantageously loaded into an adsorbent via treating the adsorbent with a solution containing low level organohalide and a hydrocarbon. The hydrocarbon could comprise paraffins, olefins, aromatics, or their mixture. The concentration of organohalide could range from about 0.0001 wt. % (or 1 ppm) to about 10 wt. %, or more preferably, from about 0.001 wt. % (or 10 ppm) to about 1 wt. %. Once contact between the adsorbent and the solution is established, the adsorbent decomposes the organohalide into an olefinic molecule and a molecule of hydrogen halide, the latter of which is then adsorbed by the adsorbent. By properly choosing the amount of organohalide in the solution and the operating conditions, it is possible to saturate the adsorbent with hydrogen halide. Notice that with this approach, hydrogen halide is generated in-situ. Neither personnel nor process equipment is exposed to the hazardous hydrohalide during the process.

For example, in accordance with U.S. Pat. No. 5,107,061, a raffinate stream from a polyisobutylene manufacturing unit, which typically contains 50% n-butane, 30% butene-1, 15% butene-2, 3% iso-butylene, 2% isobutane, 50–100 ppm secondary butyl chloride, and 5–10 ppm tertiary butyl chloride, is introduced into an absorption column packed with a zeolite adsorbent, such as zeolites X, Y, beta, and mordenite, at a temperature ranging from ambient to about 100° C., (212° F.) a pressure from ambient to about 3,450 kPa (500 psig), and a flow rate from about 0.5 to about 5 LHSV (Liquid Hourly Space Velocity). The adsorbent decomposes secondary butyl chloride into n-butene and hydrogen chloride and the resultant n-butene are released from the adsorbent pores and recovered in the column effluent. Hydrogen chloride, however, is absorbed by the adsorbent. The reaction mechanism for tertiary butyl chloride is similar except that isobutylene, instead of n-butenes, is formed.

A wide variety of solid adsorbents may be advantageously used. These adsorbents can be crystalline or amorphous. Crystalline adsorbents, however, have proven to be more advantageous. In any event, the adsorbents must have sufficient surface area and porosity to adsorb an effective amount of the hydrogen halide. The surface area of the adsorbents useful herein is from about 5 to about 1000 $m^2/g$; the surface area of zeolite crystalline adsorbents is usually from about 100 to about 1000 $m^2/g$, and preferentially from 100 to about 750 $m^2/g$; the surface area of the amorphous adsorbents is usually from about 5 to about 750 $m^2/g$ and preferably from about 150 to about 600 $m^2/g$. The average pore diameter of the adsorbent should be from about 3 to about 200 Angstrom Units; the average pore diameter of zeolite crystalline adsorbents used herein is usually less than about 10; the average pore size of amorphous adsorbents used herein is usually from about 10 to 20 Angstrom Units to about 200 Angstrom Units, and preferentially from about 20 to 100 Angstrom Units.

Suitable adsorbents include synthetic or naturally occurring zeolites such as faujasite, zeolite X, zeolite Y, mordenite, and various other zeolites as may be suitable, e.g., zeolite ZK-4, zeolite ZSM-5, as well as such inorganic materials as bauxite, clay, silica and/or metal oxides and naturally occurring clays, which can be composited with the zeolites. These include the montmorillonite and kaolin families, which include the sub-bentonites and the kaolins commonly known as Dixie, McNamme-Georgia and Florida clays or others in which the main mineral constituent is halloyxite, kaolinite, dickite, nacrite or anauxite and activated carbons. Such clays can be used in the raw state as originally mined or initially subject to calcination, acid treatment or chemical modification.

For purposes of the present invention, zeolites having an effective pore size of from about 5 to about 15 Angstrom units are suitable; however, zeolites having an effective pore size within the range of from about 5 to about 10 Angstrom units are preferred.

The zeolites preferred for purposes of the present invention may be in the form of crushed or beaded particles. For purposes of the present invention, zeolite X, Y, A, beta, and mordenite are the more preferred zeolites. However, zeolite X, i.e., sodium X zeolite, is the most preferred zeolite. Zeolite X molecular sieves are described in U.S. Pat. No. 2,883,244, a specific example which is disclosed in U.S. Pat. No. 3,862,900, the disclosures of which are hereby incorporated by reference herein thereto.

Properties of zeolites suitable for this application are described, for example, in "Zeolite Molecular Sieves" by D. W. Breck, R. E. Krieger Publishing Co., 1984. The zeolites are commercially available from UOP Inc. Properties of some zeolites are listed below:

Zeolite X
    Average Composition: $Na_2O$—$Al_2O_3$—$2.5SiO_2$—$6H_2O$
    Pore Diameter: ~10 A
    Reference: R. M. Milton, U.S. Pat. No. 2,882,244 (1959)

Zeolite Y
    Average composition: $Na_2O$—$Al_2O_3$—$4.8SiO_2$—$8.9H_2O$
    Pore Diameter: ~10 A
    Reference: D. W. Breck, U.S. Pat. No. 3,130,007 (1964)

Zeolite A
    Average composition: $0.25Na_2O$—$0.75CaO$—$Al_2O_3 2SiO_2$—$4.5H_2O$
    Pore Diameter: ~5 A
    Reference: R. M. Milton, U.S. Pat. No. 2,882,243 (1959)

Zeolite Mordenite
    Average composition: $Na_2O$—$Al_2O_3$—$9$–$10SiO_2$—$6H_2O$
    Pore Diameter: ~7 A
    Reference: R. M. Milton, U.S. Pat. No. 2,882,244 (1959)

Alumina suitable for purposes of the present invention may be selected from conventional alumina absorbents which have appropriate high absorptive power, a high surface area, suitable hardness, resistance to crumbling during handling and use, suitable size and granular form. The following description relates to alumina suitable for purposes of the present invention.

Kaiser Activated Alumina A-201 (neutral)
    8×14 mesh spheres with a high surface area (325 $m^2/gm$)
    Typical analysis 93.25% $Al_2O_3$
    (dry basis) 0.35% $Na_2O$
    0.02% $Fe_2O_3$
    0.02% $SiO_2$ Alumina has been found to be particularly effective in decomposing tertiary halides, while zeolite has been used to effectively decompose primary and secondary halides.

In addition to the foregoing materials, zeolites employed herein may also be composited with material such as bauxite, alumina, silica-alumina, silica-magnesia, silica-zirconia, silica-thoria, silica, berylia, silica-titania as well as ternary compositions, such as silica-alumina-thoria, silica-alumina, zirconia, silica,-alumina-magnesia and silica-magnesia-zirconia. Preferred are sorbents selected from the group consisting of various forms of silica, bauxite, mordenite, faujasite, natural and synthetic clays, amorphous and crystalline alumino-silicates, alumina and silica-alumina mixtures; silica-alumina mixtures may contain about 5 to 95 wt. % silica or preferably about 5 to 25 wt. % or about 75 to 95 wt. % silica to alumina. Cracking catalysts, such as the fresh, spent or regenerated bead type, may be used herein as adsorbents.

The effective amount of adsorbed hydrogen halide will vary dependent upon type of adsorbent, adsorption conditions of temperature and pressure as well as reaction parameters. The adsorbent disclosed herein will contain from about 1 to about 20 wt. % of adsorbed hydrogen halide, and preferably from about 5 to about 20 wt. % based on the total weight of the adsorbent.

The process of removing lead contaminants, e.g., tetraethyl or tetramethyl lead, from liquid hydrocarbons is conveniently carried out in a simple flow or batch process. A solution of the lead contaminated hydrocarbon is passed over the adsorbent, e.g., NaX-zeolite, lead compounds in the solution undergo a displacement reaction giving an insoluble alkyl salt, i.e., tetraethyl lead chloride $((C_2H_5)_3$ Pb Cl$)$ and a hydrocarbon product, i.e., ethane $(C_2H_6)$. The insoluble salt remains on the adsorbent. The process is carried out at room temperature or at any temperature below the boiling point of the liquid hydrocarbons. Preferred operating conditions are at a temperature of from about 150°–65° C., an LHSV of about 5–20 and at atmospheric or higher pressure.

To ensure that no hydrogen chloride is present in the treated hydrocarbon stream, this process may be followed by a second adsorbent, i.e., silica, alumina, mixtures thereof and calcined X and Y zeolites, such as calcined NaX, to remove any hydrogen chloride which was striped off the adsorbent during the lead removal process. For a "wet" (having more than about 100 ppm water) hydrocarbon feed, a drying step utilizing the above operating conditions and also utilizing calcined NaX or other suitable desiccant can precede the lead removal step e.g., commercial drying agents comprised of silica, alumina, mixtures thereof, and X and Y zeolites are suitable.

EXAMPLES

The following non-limiting examples are given to show the removal efficiency of the HCl loaded adsorbent.

Two Parr reactors were each charged with 10.0 grams of aviation fuel. In the first two reactors, the lead level in the fuel was 44 ppm. The third reactor was charged with 148.0 grams of aviation fuel, and the lead level in the fuel was 2 ppm.

The first reactor was charged with 1.03 grams of Na-X zeolite which had a 0% HCl loading. The second reactor was charged with 1.04 grams of Na-X zeolite with a 5.0% HCl loading. The third reactor was charged with 4.11 grams of alumina, which had a 20.0% HCl loading.

Each reactor was then left at ambient temperature (25° C. or 75° F.) for eighteen (18) hours. Lead concentration levels of the aviation fuel were then measured. The results are tabulated below.

| Example Adsorbent | HCl Loading | Aviation Fuel Grams | Adsorbent Grams | Lead Concentration in Aviation Fuel Before | After |
|---|---|---|---|---|---|
| 1 Na—X Zeolite | 0.0 wt % | 10.0 | 1.03 | 44 ppm | 52 ppm |
| 2 Na—X Zeolite | 5.0 wt % | 10.0 | 1.04 | 44 ppm | 0.6 ppm |
| 3 Alumina | 20.0 wt % | 148.0 | 4.11 | 2 ppm | .03 ppm |

Example 1 shows that without a hydrogen chloride loading, lead removal does not occur. The lead level appears to increase. This is explained by the fact that the adsorbent is actually adsorbing the hydrocarbon preferentially, making the lead level in the remaining hydrocarbon more concentrated.

Examples 2 and 3 show that lead removal does in fact occur both at the 5.0% and 20.0% loadings. Once HCl is loaded onto the zeolite, the adsorbent characteristics of the zeolite are changed as compared to Example 1. The hydrocarbon is no longer preferentially adsorbed. The HCl loaded zeolite selectively adsorbs the lead out of the hydrocarbon stream. Over 98% of the lead is removed from the aviation fuel in these examples.

It will also be appreciated by those of ordinary skill in the art that, while the present invention has been described herein by reference to particular means, methods and materials, the scope of the present invention is not limited thereby and extends to any and all other means, methods and materials suitable for practice of the present invention. Therefore, although the present invention has been described with reference to particular means, materials and embodiments, from the foregoing description one skilled in the art can easily ascertain the essential characteristics of the present invention, and various changes and modifications may be made to various usages and conditions, without departing from the spirit and scope of the invention as described in the claims that follow.

We claim:

1. A process of adsorbing hydrogen halide onto an adsorbent comprising:
    (a) contacting an adsorbent selected from the group consisting of silica, clays, natural and synthetic zeolites, amorphous aluminosilicates, and mixtures thereof with an organohalide dissolved in a hydrocarbon, said organohalide is selected from the group consisting of secondary alkyl halides and tertiary alkyl halides;
    (b) decomposing said organohalide into said hydrogen halide and an olefinic organic compound; and
    (c) adsorbing said hydrogen halides onto said adsorbent.

2. The process as defined in claim 1, wherein said hydrogen halide is hydrogen chloride.

3. The process as defined by claim 1, wherein said organohalide is an organochloride selected from the group consisting of secondary alkyl chlorides and tertiary alkyl chlorides.

4. The process as defined by 1, wherein said adsorbent is selected from crystalline zeolites having a pore size within the range of 5 Angstrom units to about 10 Angstrom units.

5. The process as defined by claim 4, wherein said zeolites are selected from the group consisting of zeolite X, zeolite Y, zeolite A, zeolite beta, and zeolite mordenite.

6. The process as defined by claim 5, wherein said zeolites are cation-exchanged.

7. The process as defined by claim 6, wherein the cations in said cation-exchanged zeolites are selected from the group consisting of alkali metals, alkaline earth metals, and mixtures thereof.

8. The process as defined by claim 5, wherein said zeolite is zeolite X.

9. The process as defined by claim 8, wherein said zeolite X is Na-X zeolite.

10. The process as defined by claim 9, wherein said secondary alkyl chloride is secondary butyl chloride and said tertiary alkyl chloride is tertiary butyl chloride.

11. The process as defined by claim 4, wherein said organohalide is decomposed at a temperature in the range of from about 10° C. to about 100° C., and at a pressure in the range of from about ambient to about 3,450 kPa.

12. The process as defined by claim 11, wherein said temperature is from about 15° C. to about 65° C.

13. The process as defined by claim 12, wherein said organohalide is adsorbed in an amount from about 1 to about 20 wt. %.

14. The process as defined by claim 13, wherein said organohalide is adsorbed in an amount from about 5 to about 20 wt. %.

15. A process of preparing an adsorbent containing Na-X zeolite containing hydrogen chloride comprising:

(a) contacting said adsorbent with an organochloride dissolved in a hydrocarbon, said organochloride is selected from the group consisting of secondary alkyl chlorides and tertiary alkyl chlorides; and (b) decomposing said organochloride into hydrogen chloride and an olefinic organic compound at a temperature in the range of from about 10° C. to about 100° C., and at a pressure in the range of from about ambient to about 3,450 kPa to produce said adsorbent containing from about 5 to about 20 wt. % hydrogen chloride adsorbed thereon.

\* \* \* \* \*